United States Patent [19]

Scheuermann et al.

[11] 3,880,869
[45] Apr. 29, 1975

[54] DYES OF THE BENZOPYRANE SERIES

[75] Inventors: Horst Scheuermann, Ludwigshafen; Wolfgang Mach, Hockenheim; Dietmar Augart, Ludwigshafen, all of Germany

[73] Assignee: BASF Aktiengesellschaft, Ludwigshafen, Germany

[22] Filed: Nov. 1, 1973

[21] Appl. No.: 411,759

[30] Foreign Application Priority Data
Nov. 2, 1972 Germany............................ 2253538
June 2, 1973 Germany............................ 2328146

[52] U.S. Cl. ............... 260/296 P; 8/179; 260/240 J; 260/247.5 R; 260/247.7 B; 260/268 PC; 260/293.58; 260/294.8 A; 260/295.5 P; 260/309.2
[51] Int. Cl. ............................................. C07d 7/24
[58] Field of Search ....... 260/296 P, 268 PC, 294.9, 260/293.58, 247.7 B, 247.5 R, 294.8 A, 295.5 P

[56] References Cited
OTHER PUBLICATIONS
Chemical Abstracts, Sixth Collective Index (vols. 51–55, 1957 to 1961), page 1660 s (1964).
Dean et al., J. Chem. Soc. 1957, pp. 3497 to 3510.

*Primary Examiner*—John D. Randolph
*Attorney, Agent, or Firm*—Johnston, Keil, Thompson & Shurtleff

[57] ABSTRACT

Dyes of the formula:

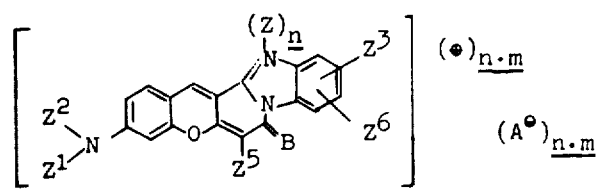

containing a benzopyrane system and a benzimidazole system. The dyes give extremely brilliant orange to red violet colorations of good fastness properties particularly in polyesters.

9 Claims, No Drawings

DYES OF THE BENZOPYRANE SERIES

The invention relates to dyes of the formula (I):

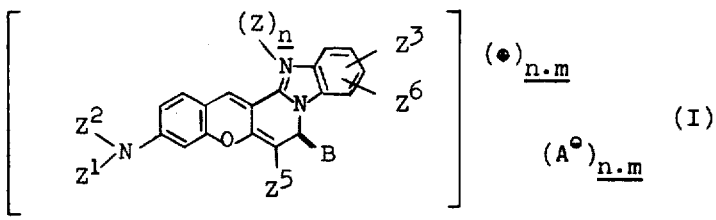

in which
- B is oxygen, imino or $N-X)_m Z^4$;
- X is —CO— or —SO$_2$—;
- Z is unsubstituted or substituted alkyl or aralkyl;
- Z$^1$ and Z$^2$ are hydrogen, unsubstituted or substituted alkyl, cycloalkyl, aralkyl or aryl;
- Z$^1$ and Z$^2$ together with the nitrogen form parts of a heterocyclic ring;
- Z$^1$ or Z$^2$ together with the nitrogen may form a saturated unsubstituted or substituted five-membered or six-membered ring condensed in ortho-position to the nitrogen;
- Z$^3$ is hydrogen, alkyl, alkoxy, halo, cyano, nitro, unsubstituted or substituted carbamoyl or sulfonamido or carbalkoxy;
- m is 1 or 2;
- n is zero or 1;
- Z$^4$ (when m is 1) is unsubstituted or substituted alkyl, cycloalkyl, aralkyl or aryl, unsubstituted or substituted vinyl, alkoxy, phenoxy or amino and (when m is 2) methylene, ethylene, phenylene, —O—C$_2$H$_4$—O—, —O—C$_2$H$_4$—O—C$_2$H$_4$—O—,

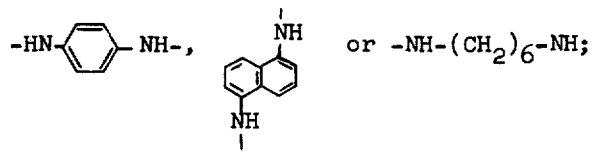

- Z$^5$ is hydrogen, carbalkoxy, nitro, cyano, alkylsulfonyl, unsubstituted or substituted carbamoyl, sulfonamide, phenyl, arylsulfonyl, benzimidazolyl, benzothiazoly, benzoxazolyl or quinazolinoyl;
- Z$^6$ is hydrogen or methyl; and
- A$^-$ is an anion.

The invention relates particularly to dyes of the formula (Ia):

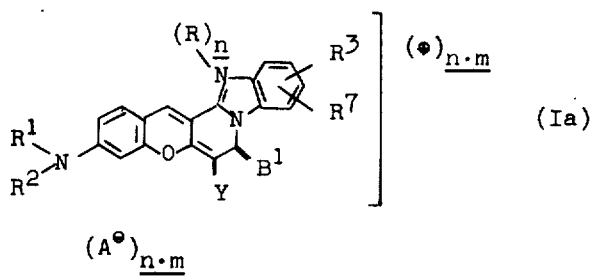

in which
- B$^1$ is oxygen, imino or $N-X)_m R^4$;
- R is methyl, ethyl, benzyl, β-hydroxyethyl, β-hydroxypropyl, β-cyanoethyl or β-carboalkoxyethyl;
- R$^1$ is hydrogen, alkyl of one to four carbon atoms, alkyl of one to four carbon atoms bearing cyano, alkoxy, chloro, bromo, carboxyl, carbalkoxy, carbamoyl or acetoxy as a substituent, cyclohexyl, benzyl, phenylethyl or phenyl;
- R$^2$ is hydrogen, alkyl of one to four carbon atoms, alkyl of one to four carbon atoms bearing cyano, alkoxy, chloro, bromo, carboxyl, carbalkoxy, carbamoyl or acetoxy as a substituent;
- R$^1$ and R$^2$ together with the nitrogen form a five-membered or six-membered heterocyclic ring;
- R$^1$ or R$^2$ together with the nitrogen form a radical of the formula:

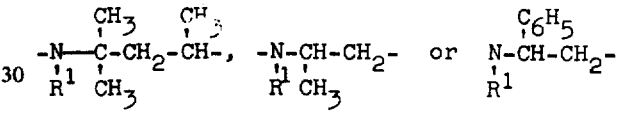

condensed on in the ortho-position to the nitrogen;
- R$^3$ is hydrogen, methyl, ethyl, isopropyl, tert-butyl, chloro, cyano, nitro, methoxy or ethoxy;
- R$^4$ when m is 1 is unsubstituted or substituted alkyl, cycloalkyl, aralkyl or aryl, unsubstituted or substituted vinyl, alkoxy, phenoxy or amino and when m is 2 is methylene, ethylene, phenylene or —O—C$_2$H$_4$—O—, —O—C$_2$H$_4$—O—C$_2$H$_4$—O—,

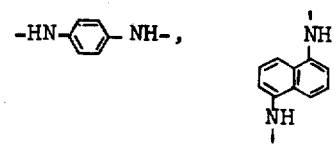

- R$^7$ is hydrogen or methyl;
- X is —CO— or —SO$_2$—;
- Y is hydrogen, carbalkoxy, cyano, alkylsulfonyl, unsubstituted or substituted carbamoyl, sulfonamido, phenylsulfonyl, phenyl, benzimidazolyl or benzothiazolyl;
- n is zero or 1;
- m is 1 or 2; and
- A$^-$ is an anion.

In addition to the radicals already individually specified the following are examples of substituents:

For Z$^1$ and Z$^2$ or R$^1$ and R$^2$:
methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carbethoxyethyl, β-carbobutoxyethyl, β-methoxypropyl, β-ethoxypropyl, β-methoxy-γ-chloropropyl, or β-acetoxypropyl.

Examples of radicals which R$^1$ and R$^2$ may form together with the nitrogen are those of pyrrolidine, piperidine, morpholine, piperazine or N-methylpiperazine.

In addition to the examples already given, $Z^3$ may be carbamoyl, N-methylcarbamoyl, N-ethylcarbamoyl, N-butylcarbamoyl, N,N-dimethylcarbamoyl, N,N-diethylcarbamoyl and the corresponding sulfonamido radicals, carbomethoxy, carbethoxy or carbobutoxy.

Examples of $R^4$ other than those already specified are:

methyl, ethyl, n-propyl, isopropyl, n-butyl, isobutyl, tert-butyl, chloromethyl, bromomethyl, methoxymethyl, ethoxymethyl, propoxymethyl, butoxymethyl, phenoxymethyl, methylmercaptomethyl, N-methylaminomethyl, N,N-dimethylaminomethyl, ethylmercaptomethyl, benzyl, carbomethoxymethyl, carbethoxymethyl, carbopropoxymethyl, cyanomethyl, acetylmethyl, β-chloroethyl, β-bromoethyl, β-hydroxyethyl, β-methoxyethyl, β-ethoxyethyl, β-butoxyethyl, β-phenoxyethyl, β-carbomethoxyethyl, β-carbobutoxyethyl, cyclohexyl, vinyl, β-phenylvinyl, β-(p-cyanophenyl)-vinyl, β-(p-nitrophenyl)-vinyl, methoxy, ethoxy, n-propoxy, isopropoxy, n-butoxy, isobutoxy, tert-butoxy, β-methoxyethoxy, β-ethoxyethoxy, 4-tert-butylcyclohexoxy, cyclohexoxy, phenyl, o-chlorophenyl, p-chlorophenyl, 2,4-dichlorophenyl, 3,5-dichlorophenyl, m-nitrophenyl, p-nitrophenyl, 2-chloro-5-nitrophenyl, o-methylphenyl, m-methylphenyl, p-methylphenyl, o-methoxyphenyl, m-methoxyphenyl, p-methoxyphenyl, 3-nitro-4-methoxyphenyl, methylamino, ethylamino, n-propylamino, isopropylamino, n-butylamino, isobutylamino, tert-butylamino, cyclohexylamino, benzylamino, phenylamino, o-chlorophenylamino, m-chlorophenylamino, p-chlorophenylamino, p-(trifluoromethyl)-phenylamino, p-methylphenylamino, o-methylphenylamino, m-methylphenylamino, p-methoxyphenylamino, o-methoxyphenylamino or m-methoxyphenylamino.

Examples of specific radicals for $Z^5$ and Y in addition to those already specified are:

carbomethoxy, carbethoxy, carbobutoxy, carbo-β-methoxyethoxy, carbo-β-ethoxyethoxy, methylsulfonyl, ethylsulfonyl, phenylsulfonyl, phenylsulfonyl bearing chloro, methyl, methoxy or alkoxy as a substituent, carbamoyl, N-alkylcarbamoyl, or N,N-dialkylcarbamoyl such as diethylcarbamoyl, ethylcarbamoyl, butylcarbamoyl, isooctylcarbamoyl, methylcarbamoyl, dimethylcarbamoyl, dipropylcarbamoyl, dibutylcarbamoyl or N-methyl-N-butylcarbamoyl, carboxyanilide, cyclohexylcarbamoyl, benzylcarbamoyl, carboxypyrrolidide, carboxypiperidide, carboxymorpholide, carboxypiperazide, carboxy-N-methylpiperazide and the corresponding sulfonamido radicals, phenyl, methylphenyl, chlorophenyl, methoxyphenyl, ethoxyphenyl, cyanophenyl, nitrophenyl, carbomethoxyphenyl, carbethoxyphenyl, benzimidazolyl, methylbenzimidazolyl, chlorobenzimidazolyl, N-methylbenzimidazolyl, N-methylmethylbenzimidazolyl, benzothiazolyl or chlorobenzothiazolyl.

The same carbalkoxy radicals as for Y are suitable for R.

Examples of anions A⁻ are chloride, bromide, nitrate, thiocyanate, phosphate, sulfate, methosulfate, ethosulfate, formate, acetate, p-toluenesulfonate, tetrachlorozincate or tetrafluoborate.

Dyes having particular technical significance are those having the formula (Ib):

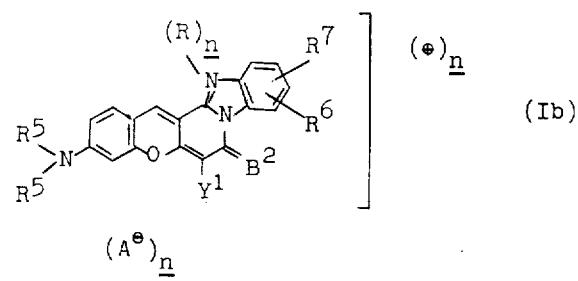

in which $B^2$ is oxygen, imino or $N-X-R^4$;

$R^5$ is alkyl of one to four carbon atoms, preferably methyl or ethyl;

$R^6$ is hydrogen, methyl, chloro or cyano; and $Y^1$ is cyanophenyl, cyano, phenylsulfonyl, carbomethoxy or carbethoxy; and $n$, R, $R^4$, $R^7$, X and A⁻ have the above meanings. Cyano is preferred for $Y^1$. Methyl, ethyl, benzyl, β-hydroxyethyl, β-hydroxypropyl, β-cyanoethyl and β-carbomethoxyethyl are preferred for R.

Unsubstituted or substituted phenylalkyl, phenyl, phenoxy and phenylamino are preferred for $R^4$. Suitable substituents are chloro, bromo, cyano, methyl, methoxy, ethyl, ethoxy, t-butyl and trifluoromethyl.

Dyes in which $n$ is zero are preferred to those in which $n$ is 1.

The new fluorescent dyes have high brilliance and the hues are within the range from orange to violet. They are suitable for dyeing textile material of polyamides, cellulose esters, acrylonitrile polymers ($n = 1$) and polyesters and also for the mass coloration of plastics.

Compounds of the formula (I) may be prepared by reacting a compound of the formula (II):

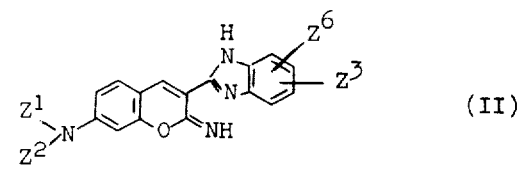

with a compound of the formula (III):

and if necessary hydrolyzing, acylating and/or quaternizing the resulting compound of the formula (IV):

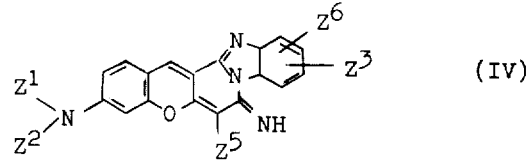

$Z^1$, $Z^2$, $Z^3$, $Z^5$ and $Z^6$ having the above meanings and A being cyano or carbalkoxy, particularly of two to five carbon atoms.

Compounds of the formula (II) are known from DOS No. 1,619,567.

Reaction of compounds (II) and (III) is conveniently carried out in a solvent at a temperature of from 50° to 200°C and preferably of from 100° to 150°C; an acid or preferably a base may be added for example in a catalytic amount.

Polar organic solvents are particularly suitable, examples being glycols and glycol ethers such as ethylene glycol or ethylene glycol monomethyl ether, chlorobenzene, dichlorobenzene, trichlorobenzene, dimethylformamide, N-methylpyrrolidone and also acetic anhydride with or without the addition of alkali metal acetate, or mixtures of solvents.

Examples of bases which may be used are: amines such as ethyldiisopropylamine, triethylamine, piperidine, pyridine, pyrrolidine or morpholine; sodium carbonate, potassium carbonate, sodium methylate and potassium methylate.

Examples of suitable acids are p-toluenesulfonic acid, benzenesulfonic acid, phosphoric acid, tetrafluoboric acid and hydrochloric acid. Compounds of formula (I) with $n$ equal to zero may be quaternized by a conventional method for the production of quaternized compounds of the formula (I) with $n$ equal to 1. Examples of quaternizing agents are the esters of strong acids such as methyl iodide, dimethyl sulfate, diethyl sulfate, methyl or ethyl p-toluenesulfonate, benzyl chloride, benzyl bromide, epoxides such as ethylene oxide or propylene oxide and acrylic acid derivatives such as acrylonitrile or methyl, ethyl or butyl acrylates.

Quaternization is conveniently carried out in a solvent such as a chlorohydrocarbon or hydrocarbon at elevated temperature. Examples of specific solvents are chloroform, ethylene chloride, chlorobenzene, o-dichlorobenzene, toluene and xylene.

An excess of quaternizing agent may be used instead of a solvent. Quaternization in water is also possible.

Hydrolysis of compounds of formula (IV) into the corresponding keto compounds may be carried out by the action of acid, particularly at elevated temperature.

Examples of acylating agents are acid halides, acid anhydrides, chlorocarbonates, isocyanates and ketenes. It is preferred to use isocyanates and diketene.

Acylation is conveniently carried out in a solvent in the presence of an inorganic or organic base, preferably an amine at a temperature of from 0° to 150°C and preferably from 20° to 100°C.

Particularly suitable solvents are organic solvents, for example hydrocarbons such as benzene, toluene and xylene; halohydrocarbons such as 1,2-dichloroethane, chlorobenzene and dichlorobenzene; glycol ethers such as glycol diethyl ether and diethylene glycol diethyl ether, dioxane and tetrahydrofuran.

Examples of bases are: alkali metal carbonates such as sodium or potassium carbonate, alkali metal salts of lower fatty acids such as sodium or potassium acetate; and particularly organic bases such as triethylamine and pyridine. The organic base may serve at the same time as a solvent.

Production of compounds of the formula (I) in which $R^3$ is acetonyl may be carried out by the reaction of a compound of formula (II) with diketene.

Compounds of the formula (I) in which $R^3$ is an unsubstituted or substituted amino group are obtained by the reaction of a compound of formula (II) with an isocyanate.

These reactions are conveniently carried out in one of the said organic solvents at a temperature of from 0° to 150°C and preferably from 50° to 100°C.

Details of the reactions may be seen from the following Examples in which references to parts and percentages are by weight unless otherwise stated.

EXAMPLE 1

The dye of the formula:

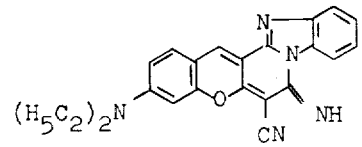

is obtained by boiling 5 parts of 3-benzimidazolyl(2')-7-diethylamino-2-iminocoumarin and 1 part of malononitrile in 45 parts of ethylene glycol monoethyl ether under reflux for 2 hours, then cooling to 5°C, suction filtering the deposited crystals, washing them with 10 parts of methanol and drying them. The yield is 3.2 parts and the melting point is about 275°C.

EXAMPLE 2

The dye of the formula:

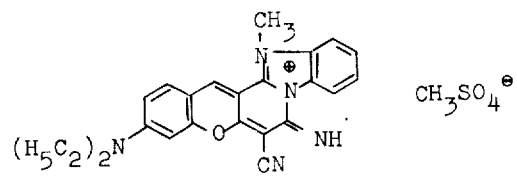

is obtained by heating 5.7 parts of the dye from Example 1, 2.52 parts of dimethyl sulfate and 130 parts of o-dichlorobenzene for 1 hour at 120°C, cooling to 20°C, suction filtering the precipitate, washing it with 40 parts of petroleum ether and drying it. The yield is 6.5 parts and the melting point is 209°C.

EXAMPLE 3

The dye of the formula:

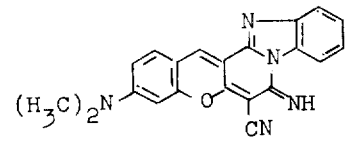

is obtained by repeating Example 1 but using 4.5 parts of 3-benzimidazolyl-(2')-7-dimethylamino-2-iminocoumarin instead of 3-benzimidazolyl-(2')-7-diethylamino-2-iminocoumarin. The yield is 5 parts and the melting point is 270° to 272°C.

EXAMPLE 4

The dye of the formula:

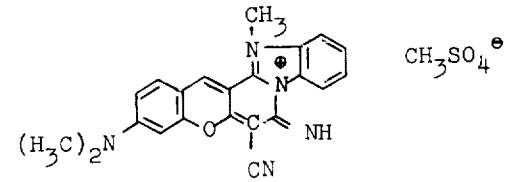

is obtained by heating 4.25 parts of the dye from Example 3 with 5.6 parts of dimethyl sulfate and 130 parts of o-dichlorobenzene for 3 hours at 120°C, then cooling to 0°C, suction filtering the deposited crystals, washing them with 10 parts of petroleum ether and drying them. The yield is 6 parts and the melting point is 220° to 225°C.

EXAMPLE 5

The dye of the formula:

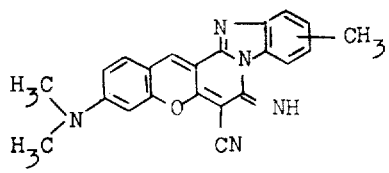

is obtained by boiling under reflux for 1 hour 3.2 parts of 3-(methyl)-benzimidazolyl-(2')-7-dimethylamino-2-iminocoumarin and 0.66 part of malononitrile in 50 parts of glycol monoethyl ether, then cooling to 0°C, suction filtering, washing with 10 parts of ethanol and drying. The yield is 3 parts and the melting point is 312°C.

EXAMPLE 6

The dye of the formula:

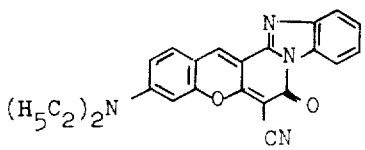

is obtained by dissolving 5.7 parts of the dye of Example 1 in 100 parts of concentrated hydrochloric acid and heating the whole for 2½ hours under reflux at 100°C, then cooling to 5°C, adding 250 parts of ice, adjusting the pH to 7.5 with 37 parts of 50% caustic soda solution, suction filtering the deposited substance, washing it with 500 parts of water and drying it. The yield is 5.7 parts and the melting point is 272° to 275°C.

EXAMPLE 7

The dye of the formula:

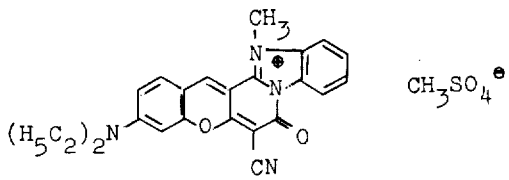

is obtained by heating 3.8 parts of the dye of Example 6 in 50 parts of o-dichlorobenzene and 2.25 parts of dimethyl sulfate for ninety minutes at 90°C, then cooling to 20°C, adding 50 parts of petroleum ether 40–60, suction filtering the deposited substance and drying it. The yield is 4.1 parts and the melting point is 245°C with decomposition.

Dyes characterized by their substituents in the following Table are obtained by methods analogous to those described in the Examples.

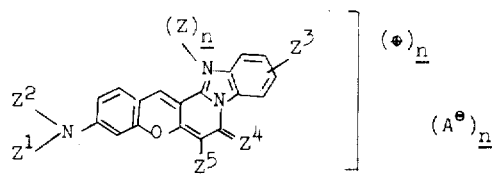

| Ex. | $Z^4$ | $Z^5$ | Z | $Z^1$ | $Z^2$ | $Z^3$ | n | $A^\ominus$ | Shade on polyester |
|---|---|---|---|---|---|---|---|---|---|
| 8 | NH | CN | - | $C_2H_5$ | $C_2H_5$ | $CH_3$ | 0 | - | red |
| 9 | O | CN | $CH_3$ | $C_2H_5$ | $C_2H_5$ | $CH_3$ | 1 | $CH_3SO_4$ | violet red (polyacrylonitrile) |
| 10 | NH | CN | $C_2H_5$ | $C_2H_5$ | $C_2H_5$ | $CH_3$ | 1 | $C_2H_5SO_4$ | violet red |
| 11 | NH | CN | $CH_2C_6H_5$ | $C_2H_5$ | $C_2H_5$ | $CH_3$ | 1 | Br | violet red |
| 12 | O | CN | $CH_2-CH_2OH$ | $C_2H_5$ | $C_2H_5$ | $CH_3$ | 1 | Cl | violet red |
| 13 | O | CN | $CH_2-CH(OH)CH_3$ | $C_2H_5$ | $C_2H_5$ | $CH_3$ | 1 | $1/2\,ZnCl_4$ | violet red |
| 14 | O | CN | $C_2H_4CN$ | $C_2H_5$ | $C_2H_5$ | $CH_3$ | 1 | $BF_4$ | violet red (polyacrylonitrile) |
| 15 | O | CN | $C_2H_4CO_2CH_3$ | $C_2H_5$ | $C_2H_5$ | $CH_3$ | 1 | $CH_3CO_2$ | violet red |
| 16 | O | CN | $C_2H_4CO_2C_4H_9$ | $C_2H_5$ | $C_2H_5$ | $CH_3$ | 1 | $NO_3$ | violet red |
| 17 | O | CN | $C_2H_4CO_2C_2H_5$ | $C_2H_5$ | $C_2H_5$ | $CH_3$ | 1 | SNC | violet red |
| 18 | O | CN | - | $C_2H_5$ | $C_2H_5$ | $CH_3$ | 0 | - | red |
| 19 | NH | CN | - | H | H | H | 0 | - | red |
| 20 | NH | CN | - | $C_4H_9$ | $C_4H_9$ | H | 0 | - | red |

—Continued

| Example | $Z^4$ | $Z^5$ | Z | $Z^1$ | $Z^2$ | $Z^3$ | n | $A^\ominus$ | Shade on polyester |
|---|---|---|---|---|---|---|---|---|---|
| 21 | NH | CN | - | $C_2H_4OCH_3$ | $C_2H_4OCH_3$ | H | 0 | - | red |
| 22 | NH | CN | - | $C_2H_4CN$ | $C_2H_4OC_2H_5$ | H | 0 | - | red |
| 23 | NH | CN | - | $C_2H_4OCOCH_3$ | $C_2H_4OCOCH_3$ | H | 0 | - | red |
| 24 | NH | CN | - | $C_2H_4Cl$ | $C_2H_4Cl$ | H | 0 | - | red |
| 25 | NH | CN | - | $CH_3$ | $C_2H_4CO_2CH_3$ | H | 0 | - | red |
| 26 | NH | CN | - | $C_2H_4CO_2C_2H_5$ | $C_2H_4CO_2C_2H_5$ | H | 0 | - | red |
| 27 | NH | CN | - | $CH_3$ | $C_2H_4CO_2C_4H_9$ | H | 0 | - | red |
| 28 | NH | CN | - | $CH_2-CH(OCH_3)CH_3$ | $CH_2-CH(OCH_3)CH_3$ | H | 0 | - | red |
| 29 | NH | CN | - | $C_4H_9$ | $CH_2-CH(OC_2H_5)CH_3$ | H | 0 | - | red |
| 30 | NH | CN | - | $C_2H_5$ | $CH_2-CH(OCH_3)CH_2Cl$ | H | 0 | - | red |
| 31 | NH | CN | - | $C_2H_5$ | $CH_2-CH(OCOCH_3)CH_3$ | H | 0 | - | red |
| 32 | NH | CN | - | $C_3H_6CO_2H$ | $C_2H_5$ | H | 0 | - | red |
| 33 | NH | CN | - | $C_4H_8COCH_3$ | $C_2H_5$ | H | 0 | - | red |
| 34 | NH | CN | - | $CH_2CONH_2$ | $CH_2CONH_2$ | H | 0 | - | red |
| 35 | NH | CN | - | $CH_2CONHCH_3$ | $CH_3$ | H | 0 | - | red |
| 36 | NH | CN | - | $C_2H_4CON(C_2H_5)_2$ | H | H | 0 | - | red |
| 37 | NH | CN | - | $C_2H_4CONHC_4H_9$ | $CH_3$ | H | 0 | - | red |

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 38 | NH | CN | - | $CH_2-CON\!\!<\!\!O$ | $CH_3$ | H | 0 | - | red |
| 39 | NH | CN | - | $CH_2-CON\!\!<\!\!N-CH_3$ | $CH_3$ | H | 0 | - | red |
| 40 | NH | CN | - | cyclohexyl | cyclohexyl | H | 0 | - | red |
| 41 | NH | CN | - | cyclohexyl | $-CH_2-$phenyl | H | 0 | - | red |
| 42 | NH | CN | - | $CH_2-CH_2-$phenyl | $CH_2-$phenyl | H | 0 | - | red |
| 43 | NH | CN | - | $CH_2-CH_2-$cyclohexenyl | cyclohexenyl | H | 0 | - | red |
| 44 | NH | CN | - | $C_6H_5$ | $C_6H_5$ | H | 0 | - | red |
| 45 | NH | CN | - | $-C_4H_8-$ | | H | 0 | - | red |
| 46 | NH | CN | - | $-C_2H_4NHC_2H_4-$ | | H | 0 | - | red |
| 47 | NH | CN | - | $-C_5H_{10}-$ | | H | 0 | - | red |
| 48 | NH | CN | - | $-C_2H_4OC_2H_4-$ | | H | 0 | - | red |
| 49 | NH | CN | - | $-C_2H_4N(CH_3)C_2H_4-$ | | H | 0 | - | red |
| 50 | NH | CN | - | $CH_3$ | $-(H_3C)_2C-CH_2-CH(CH_3)-$ | H | 0 | - | red |
| 51 | NH | CN | - | $C_4H_9$ | $-(H_3C)_2C-CH_2-CH(CH_3)-$ | H | 0 | - | red |
| 52 | NH | CN | - | $CH_2-C_6H_5$ | $-(H_3C)_2C-CH_2-CH(CH_3)-$ | H | 0 | - | red |

—Continued

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 53 | NH | CN | - | $C_2H_4OH$ | $-(H_3C)_2C-CH_2-CH(CH_3)-$ | H | 0 | - | red |
| 54 | NH | CN | - | $C_2H_5$ | $-(H_3C)_2C-CH_2-CH(CH_3)-$ | H | 0 | - | red |
| 55 | NH | CN | - | $C_2H_4C_6H_5$ | $-(H_3C)_2C-CH_2-CH(CH_3)-$ | H | 0 | - | red |
| 56 | NH | CN | - | $C_2H_4OCOCH_3$ | $-(H_3C)_2C-CH_2-CH(CH_3)-$ | H | 0 | - | red |
| 57 | NH | CN | - | $C_2H_4CO_2C_4H_9$ | $-(H_3C)_2C-CH_2-CH(CH_3)-$ | H | 0 | - | red |
| 58 | NH | CN | - | $C_2H_4CON(C_2H_5)_2$ | $-(H_3C)_2C-CH_2-CH(CH_3)-$ | H | 0 | - | red |
| 59 | NH | CN | - | $CH_2-CON\bigcirc$ | $-(H_3C)_2C-CH_2-CH(CH_3)-$ | H | 0 | - | red |
| 60 | NH | CN | - | $C_2H_5$ | $C_2H_5$ | $OCH_3$ | 0 | - | red |
| 61 | NH | CN | - | $C_2H_5$ | $C_2H_5$ | $OC_2H_5$ | 0 | - | red |
| 62 | NH | CN | - | $C_2H_5$ | $C_2H_5$ | $C_4H_9$ | 0 | - | red |
| 63 | NH | CN | - | $C_2H_5$ | $C_2H_5$ | $OC_4H_9$ | 0 | - | red |
| 64 | NH | CN | - | $C_2H_5$ | $C_2H_5$ | Cl | 0 | - | red |
| 65 | NH | CN | - | $C_2H_5$ | $C_2H_5$ | Br | 0 | - | red |
| 66 | NH | CN | - | $C_2H_5$ | $C_2H_5$ | CN | 0 | - | red |
| 67 | NH | CN | - | $C_2H_5$ | $C_2H_5$ | $NO_2$ | 0 | - | red |
| 68 | NH | CN | - | $C_2H_5$ | $C_2H_5$ | $CONH_2$ | 0 | - | red |
| 69 | NH | CN | - | $C_2H_5$ | $C_2H_5$ | $CONHC_2H_5$ | 0 | - | red |
| 70 | NH | CN | - | $C_2H_5$ | $C_2H_5$ | $CONHC_4H_9$ | 0 | - | red |
| 71 | NH | CN | - | $C_2H_5$ | $C_2H_5$ | $CON(C_2H_5)_2$ | 0 | - | red |
| 72 | NH | CN | - | $C_2H_5$ | $C_2H_5$ | $CON\bigcirc$ | 0 | - | red |
| 73 | NH | CN | - | $C_2H_5$ | $C_2H_5$ | $CO-N\bigcirc N-CH_3$ | 0 | - | red |
| 74 | NH | CN | - | $C_2H_5$ | $C_2H_5$ | $CO-NHC_6H_5$ | 0 | - | red |
| 75 | NH | CN | - | $C_2H_5$ | $C_2H_5$ | $CON\bigcirc$ | 0 | - | red |
| 76 | NH | CN | - | $C_2H_5$ | $C_2H_5$ | $CON\bigcirc$ | 0 | - | red |
| 77 | NH | CN | - | $C_2H_5$ | $C_2H_5$ | $SO_2NH_2$ | 0 | - | red |
| 78 | NH | CN | - | $C_2H_5$ | $C_2H_5$ | $SO_2NHCH_3$ | 0 | - | red |
| 79 | NH | CN | - | $C_2H_5$ | $C_2H_5$ | $SO_2N(C_3H_7)_2$ | 0 | - | red |
| 80 | NH | CN | - | $C_2H_5$ | $C_2H_5$ | $SO_2NH-\bigcirc H$ | 0 | - | red |
| 81 | NH | CN | - | $C_2H_5$ | $C_2H_5$ | $SO_2N\bigcirc N-CH_3$ | 0 | - | red |
| 82 | NH | CN | - | $C_2H_5$ | $C_2H_5$ | $SO_2N\bigcirc O$ | 0 | - | red |
| 83 | NH | CN | - | $C_2H_5$ | $C_2H_5$ | $CO_2CH_3$ | 0 | - | red |

—Continued

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 84 | NH | CN | - | $C_2H_5$ | $C_2H_5$ | $CO_2C_2H_5$ | 0 | - | red |
| 85 | NH | CN | - | $C_2H_5$ | $C_2H_5$ | $CO_2C_4H_9$ | 0 | - | red |
| 86 | NH | CN | - | $C_2H_5$ | $C_2H_5$ | tert. $C_4H_9$ | 0 | - | red |
| 87 | NH | $CONH_2$ | - | $C_2H_5$ | $C_2H_5$ | H | 0 | - | red |
| 88 | NH | $CO_2CH_3$ | - | $C_2H_5$ | $C_2H_5$ | H | 0 | - | red |
| 89 | NH | $CO_2C_2H_5$ | - | $C_2H_5$ | $C_2H_5$ | H | 0 | - | red |
| 90 | O | $CO_2C_4H_9$ | - | $C_2H_5$ | $C_2H_5$ | H | 0 | - | red |
| 91 | O | $CONHC_3H_7$ | - | $C_2H_5$ | $C_2H_5$ | H | 0 | - | red |
| 92 | O | $CON(C_2H_5)_2$ | - | $C_2H_5$ | $C_2H_5$ | H | 0 | - | red |
| 93 | O | $CON(C_4H_9)_2$ | - | $C_2H_5$ | $C_2H_5$ | H | 0 | - | red |
| 94 | O | $CON(CH_3)C_4H_9$ | - | $C_2H_5$ | $C_2H_5$ | H | 0 | - | red |
| 95 | NH | $CONHC_6H_5$ | - | $C_2H_5$ | $C_2H_5$ | H | 0 | - | red |
| 96 | NH | CONH-⟨H⟩ | - | $C_2H_5$ | $C_2H_5$ | H | 0 | - | red |
| 97 | NH | $CONH-CH_2-C_6H_5$ | - | $C_2H_5$ | $C_2H_5$ | H | 0 | - | red |
| 98 | NH | CO-N⟨⟩ | - | $C_2H_5$ | $C_2H_5$ | H | 0 | - | red |
| 99 | NH | CO-N⟨⟩ | - | $C_2H_5$ | $C_2H_5$ | H | 0 | - | red |

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 100 | NH | CO-N⟨⟩O | - | $C_2H_5$ | $C_2H_5$ | H | 0 | - | red |
| 101 | NH | CO-N⟨⟩N-H | - | $C_2H_5$ | $C_2H_5$ | H | 0 | - | red |
| 102 | NH | CO-N⟨⟩N-$CH_3$ | - | $C_2H_5$ | $C_2H_5$ | H | 0 | - | red |
| 103 | NH | $SO_2NHC_6H_5$ | - | $C_2H_5$ | $C_2H_5$ | H | 0 | - | red |
| 104 | NH | $SO_2NH$-⟨H⟩ | - | $C_2H_5$ | $C_2H_5$ | H | 0 | - | red |
| 105 | NH | $SO_2N(CH_3)_2$ | - | $C_2H_5$ | $C_2H_5$ | H | 0 | - | red |
| 106 | O | $SO_2N$⟨⟩O | - | $C_2H_5$ | $C_2H_5$ | H | 0 | - | red |
| 107 | O | $SO_2N$⟨⟩ | - | $C_2H_5$ | $C_2H_5$ | H | 0 | - | red |
| 108 | O | $SO_2CH_3$ | - | $C_2H_5$ | $C_2H_5$ | H | 0 | - | red |
| 109 | NH | $SO_2C_2H_5$ | - | $C_2H_5$ | $C_2H_5$ | H | 0 | - | red |
| 110 | NH | $SO_2C_6H_5$ | - | $C_2H_5$ | $C_2H_5$ | H | 0 | - | red |
| 111 | NH | $SO_2$-⟨⟩-Cl | - | $C_2H_5$ | $C_2H_5$ | H | 0 | - | red |
| 112 | NH | $SO_2$-⟨⟩-$OCH_3$ | - | $C_2H_5$ | $C_2H_5$ | H | 0 | - | red |
| 113 | NH | $SO_2$-⟨⟩-$OC_2H_5$ | - | $C_2H_5$ | $C_2H_5$ | H | 0 | - | red |

-Continued

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 114 | NH | phenyl | - | $C_2H_5$ | $C_2H_5$ | H | 0 | - | red |
| 115 | NH | 4-methylphenyl | - | $C_2H_5$ | $C_2H_5$ | H | 0 | - | red |
| 116 | NH | 4-chlorophenyl | - | $C_2H_5$ | $C_2H_5$ | H | 0 | - | red |
| 117 | NH | 4-methoxyphenyl | - | $C_2H_5$ | $C_2H_5$ | H | 0 | - | red |
| 118 | NH | 2,3-dimethoxyphenyl | - | $C_2H_5$ | $C_2H_5$ | H | 0 | - | red |
| 119 | NH | 4-ethoxyphenyl | - | $C_2H_5$ | $C_2H_5$ | H | 0 | - | red |
| 120 | NH | 4-cyanophenyl | - | $C_2H_5$ | $C_2H_5$ | H | 0 | - | red |
| 121 | NH | 4-nitrophenyl | - | $C_2H_5$ | $C_2H_5$ | H | 0 | - | red |

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 122 | NH | 4-($CO_2CH_3$)phenyl | - | $C_2H_5$ | $C_2H_5$ | H | 0 | - | red |
| 123 | NH | 4-($CO_2C_2H_5$)phenyl | - | $C_2H_5$ | $C_2H_5$ | H | 0 | - | red |
| 124 | NH | benzimidazol-2-yl | - | $C_2H_5$ | $C_2H_5$ | H | 0 | - | red |
| 125 | NH | 5-methylbenzimidazol-2-yl | - | $C_2H_5$ | $C_2H_5$ | H | 0 | - | red |
| 126 | NH | 5-chlorobenzimidazol-2-yl | - | $C_2H_5$ | $C_2H_5$ | H | 0 | - | red |
| 127 | NH | 1,5-dimethylbenzimidazol-2-yl | - | $C_2H_5$ | $C_2H_5$ | H | 0 | - | red |
| 128 | NH | benzothiazol-2-yl | - | $C_2H_5$ | $C_2H_5$ | H | 0 | - | red |

-Continued

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 129 | NH | benzothiazole-Cl | - | $C_2H_5$ | $C_2H_5$ | H | 0 | - | red |
| 130 | O | phenyl-CN | - | $C_2H_5$ | $C_2H_5$ | H | 0 | - | red |
| 131 | NH | phenyl-CN | - | $C_2H_5$ | $C_2H_5$ | H | 0 | - | red |
| 132 | O | CN | - | $CH_3$ | $-CH(CH_3)-CH_2-$ | H | 0 | - | red |
| 133 | O | CN | - | $C_4H_9$ | $-CH(CH_3)-CH_2-$ | H | 0 | - | red |
| 134 | O | CN | - | $CH_3$ | $-CH(C_6H_5)-CH_2-$ | H | 0 | - | red |
| 135 | O | CN | - | $C_4H_9$ | $-CH(C_6H_5)-CH_2-$ | H | 0 | - | red |
| 136 | O | CN | - | $C_2H_4CN$ | $C_2H_4CN$ | H | 0 | - | red |
| 137 | O | H | - | $C_2H_5$ | $C_2H_5$ | H | 0 | - | red |

| Example | $Z^4$ | $Z^5$ | Z | $Z^1$ | $Z^2$ | $Z^3$ | n | $A^\ominus$ | Hue on polyester |
|---|---|---|---|---|---|---|---|---|---|
| 138 | O | $NO_2$ | - | $CH_3$ | $CH_3$ | H | 0 | - | red |
| 139 | O | $SO_2NH_2$ | - | $CH_3$ | $CH_3$ | H | 0 | - | red |
| 140 | O | benzoxazolyl | - | $CH_3$ | $CH_3$ | H | 0 | - | red |
| 141 | O | quinazolinonyl | - | $CH_3$ | $CH_3$ | H | 0 | - | red |
| 142 | O | $-SO_2-C_6H_4-CH_3$ | - | $CH_3$ | $CH_3$ | H | 0 | - | red |

EXAMPLE 143

The dye of the formula:

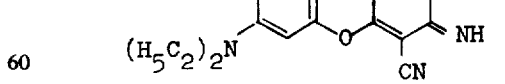

is obtained by dissolving 3.8 parts of the dye of the formula:

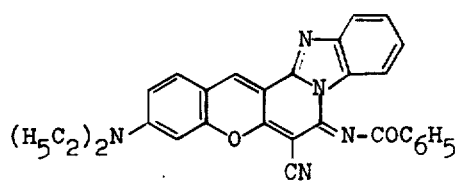

in 50 parts of pyridine, dripping in 2.8 parts of benzoyl chloride at 80°C and stirring for 1 hour at this temperature. After cooling to 20°C the reaction solution is stirred into 500 parts of water, suction filtered, washed with 1000 parts of water and dried. The yield is 4.1 parts and the melting point is 270° to 272°C.

EXAMPLE 144

The dye of the formula:

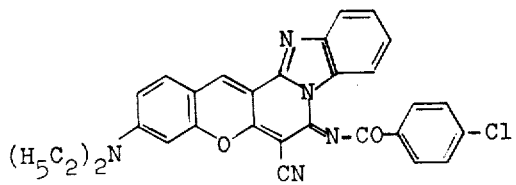

is obtained by repeating Example 143 but using 3.6 parts of p-chlorobenzoyl chloride instead of benzoyl chloride. The yield is 4.2 parts and the melting point is 300° to 302°C.

EXAMPLE 145

The dye of the formula:

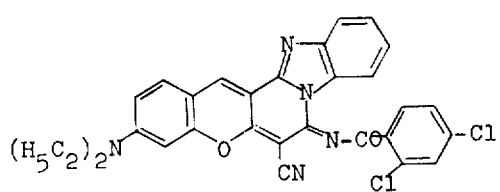

is obtained by repeating Example 143 but using 4.19 parts of 2,4-dichlorobenzoyl chloride instead of benzoyl chloride. The yield is 4.9 parts and the melting point is 270° to 273°C.

EXAMPLE 146

The dye of the formula:

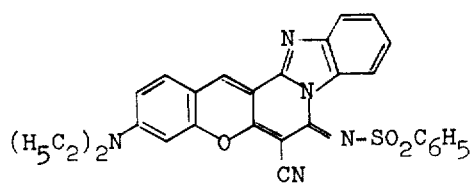

is obtained by dissolving 3.8 parts of the dye of the formula:

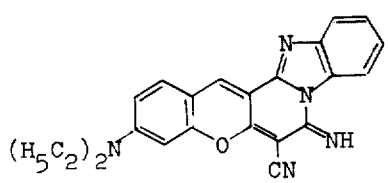

in 50 parts of pyridine, dripping 7.1 parts of benzenesulfochloride in at 80°C and stirring under reflux for 3 hours. After cooling to 20°C the reaction solution is stirred into 500 parts of water, suction filtered, washed with 2000 parts of water and dried. The yield is 4.4 parts and the melting point is 220° to 222°C.

EXAMPLE 147

The dye of the formula:

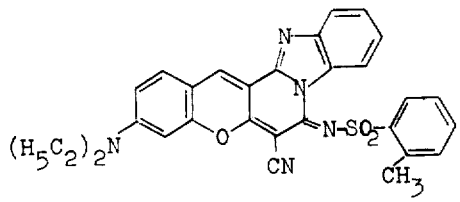

is obtained as described in Example 146 by using 7.6 parts of o-toluenesulfochloride instead of benzenesulfochloride. The yield is 4.4 parts and the melting point is 212° to 215°C.

EXAMPLE 148

The dye of the formula:

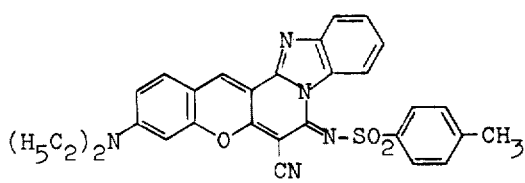

is obtained by repeating Example 146, using 7.6 parts of p-toluenesulfochloride and stirring for only 1 hour instead of 3 hours at refluxing temperature. The yield is 4.4 parts and the melting point is 220° to 225°C.

EXAMPLE 149

The dye of the formula:

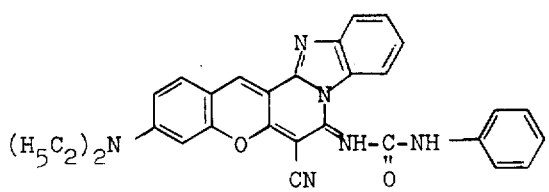

is obtained by dissolving 3.8 parts of the dye formula:

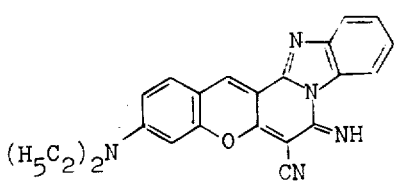

in 65 parts of o-dichlorobenzene, dripping 96 parts of phenyl isocyanate in at 100°C and stirring for 1 hour at 125°C. After cooling and suction filtration the yield is 4.2 parts and the melting point is 268° to 270°C.

EXAMPLE 150

The dye of the formula:

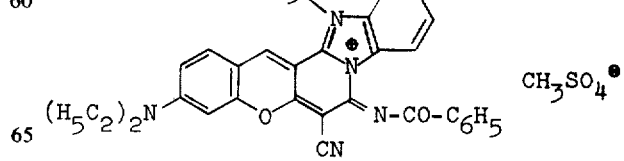

is obtained by dissolving 4.85 parts of the dye from Example 143 in 130 parts of o-dichlorobenzene, dripping 1.51 parts of dimethyl sulfate in and stirring for 3 hours at 90°C. The whole is then cooled to 20°C, 100 parts of petroleum ether (40–60) is added and the product is suction filtered. The yield is 5.1 parts and the melting point is 228° to 230°C.

The dyes characterized in the following Table by their substituents are obtained by methods analogous to those described in the foregoing Examples:

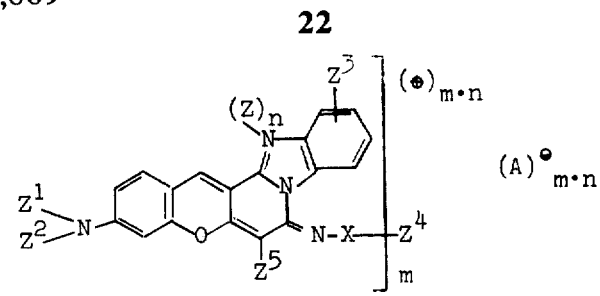

| Example | $Z^1$ | $Z^2$ | $Z^3$ | Z | m | n | $A^\ominus$ | $X-Z^4$ | $Z^5$ | Hue on polyester |
|---|---|---|---|---|---|---|---|---|---|---|
| 151 | $C_2H_5$ | $C_2H_5$ | H | - | 1 | 0 | - | $COCH_3$ | CN | red |
| 152 | " | " | H | - | 1 | 0 | - | $COC_2H_5$ | CN | red |
| 153 | " | " | H | - | 1 | 0 | - | $SO_2CH_3$ | CN | red |
| 154 | " | " | H | - | 1 | 0 | - | $CO_2C_2H_5$ | CN | red |
| 155 | " | " | H | - | 1 | 0 | - | $CO_2C_4H_9$ | CN | red |
| 156 | " | " | H | - | 1 | 0 | - | $CO_2C_6H_5$ | CN | red |
| 157 | " | " | H | - | 2 | 0 | - | $CO_2C_2H_4CO_2$ | CN | red |
| 158 | " | " | H | - | 2 | 0 | - | OCNH—⟨◯⟩—NHCO | CN | red |
| 159 | " | " | H | - | 2 | 0 | - | OC—⟨◯⟩—CO | CN | red |
| 160 | " | " | H | - | 2 | 0 | - | $CO_2C_2H_4OC_2H_4CO_2$ | CN | red |
| 161 | " | " | H | - | 1 | 0 | - | OCNH—⟨◯⟩ (with $H_3C$) | CN | red |
| 162 | " | " | H | - | 1 | 0 | - | $OC-CH_2-\underset{\underset{O}{\|}}{C}-CH_3$ | CN | red |
| 163 | " | " | H | - | 1 | 0 | - | $OC-C_3H_7$ | CN | red |
| 164 | " | " | H | - | 1 | 0 | - | $OC-CH=CH_2$ | CN | red |
| 165 | $C_2H_5$ | $C_2H_5$ | H | - | 1 | 0 | - | OC—⟨◯⟩—$NO_2$ | CN | red |
| 166 | " | " | H | - | 1 | 0 | - | $-\overset{O}{\overset{\|}{C}}-NHC_4H_9$ | CN | red |
| 167 | " | " | H | - | 1 | 0 | - | $-\overset{O}{\overset{\|}{C}}-CH=CH-$⟨◯⟩ | CN | red |
| 168 | $C_2H_5$ | $C_2H_5$ | H | - | 1 | 0 | - | $-\overset{O}{\overset{\|}{C}}-NH$—⟨◯⟩—Cl | CN | red |
| 169 | $C_2H_5$ | $C_2H_5$ | H | - | 1 | 0 | - | $-\overset{O}{\overset{\|}{C}}-CH_2-OC_4H_9$ | CN | red |
| 170 | $C_2H_5$ | $C_2H_5$ | H | - | 1 | 0 | - | $-\overset{O}{\overset{\|}{C}}-O$—⟨◯⟩ | CN | red |
| 171 | $C_2H_5$ | $C_2H_5$ | H | - | 1 | 0 | - | $-\overset{O}{\overset{\|}{C}}-NH$—⟨◯⟩—$OCH_3$ | CN | red |
| 172 | $C_2H_4Cl$ | $C_2H_4Cl$ | H | - | 1 | 0 | - | $COC_6H_5$ | CN | red |

-Continued

| Example | $z^1$ | $z^2$ | $z^3$ | Z | m | n | $A^\ominus$ | $X-z^4$ | $z^5$ | Hue on polyester |
|---|---|---|---|---|---|---|---|---|---|---|
| 173 | $CH_3$ | $C_2H_4CO_2CH_3$ | H | - | 1 | 0 | - | $COC_6H_5$ | CN | red |
| 174 | $C_2H_4CO_2C_2H_5$ | $C_2H_4CO_2C_2H_5$ | H | - | 1 | 0 | - | " | " | " |
| 175 | $CH_2-CH(OCH_3)CH_3$ | $CH_2-CH(OCH_3)CH_3$ | H | - | 1 | 0 | - | " | " | " |
| 176 | $C_2H_5$ | $CH_2-CH(OCOCH_3)CH_3$ | H | - | 1 | 0 | - | " | " | " |
| 177 | $C_3H_6CO_2H$ | $C_2H_5$ | H | - | 1 | 0 | - | " | " | " |
| 178 | $CH_2CONH_2$ | $CH_2CONH_2$ | H | - | 1 | 0 | - | " | " | " |
| 179 | $CH_2CONH_2$ | $CH_3$ | H | - | 1 | 0 | - | " | " | " |
| 180 | $C_2H_4CON(C_2H_5)_2$ | H | H | - | 1 | 0 | - | " | " | " |
| 181 | $C_2H_4CONHC_4H_9$ | $CH_3$ | H | - | 1 | 0 | - | " | " | " |
| 182 | $CH_2-CON\langle\rangle O$ | $CH_3$ | H | - | 1 | 0 | - | " | " | " |
| 183 | $CH_2-CON\langle\rangle N-CH_3$ | $CH_3$ | H | - | 1 | 0 | - | " | " | " |
| 184 | $\langle H\rangle$ | $CH_2\langle\rangle$ | H | - | 1 | 0 | - | " | " | " |
| 185 | $C_2H_4\langle\rangle$ | $CH_2\langle\rangle$ | H | - | 1 | 0 | - | " | " | " |
| 186 | $C_6H_5$ | $C_6H_5$ | H | - | 1 | 0 | - | " | " | " |

| Example | $z^1$ | $z^2$ | $z^3$ | Z | m | n | $A^\ominus$ | $X-z^4$ | $z^5$ | Hue on polyester |
|---|---|---|---|---|---|---|---|---|---|---|
| 187 | | $-C_4H_8-$ | H | - | 1 | 0 | - | $COC_6H_5$ | CN | red |
| 188 | | $-C_2H_4-NH-C_2H_4-$ | H | - | 1 | 0 | - | " | " | " |
| 189 | | $-C_5H_{10}-$ | H | - | 1 | 0 | - | " | " | " |
| 190 | | $-C_2H_4-OC_2H_4-$ | H | - | 1 | 0 | - | " | " | " |
| 191 | | $-C_2H_4-NCH_3-C_2H_4-$ | H | - | 1 | 0 | - | " | " | " |
| 192 | $CH_3$ | $-(H_3C)_2C-CH_2-CH(CH_3)-$ | H | - | 1 | 0 | - | " | " | " |
| 193 | $C_2H_5$ | $-(H_3C)_2C-CH_2-CH(CH_3)-$ | H | - | 1 | 0 | - | " | " | " |
| 194 | $CH_2C_6H_5$ | $-(H_3C)_2C-CH_2-CH(CH_3)-$ | H | - | 1 | 0 | - | " | " | " |
| 195 | $C_2H_4CO_2C_4H_9$ | $-(H_3C)_2C-CH_2-CH(CH_3)-$ | H | - | 1 | 0 | - | " | " | " |
| 196 | $C_2H_5$ | $C_2H_5$ | Br | - | 1 | 0 | - | " | " | " |
| 197 | " | " | CN | - | 1 | 0 | - | " | " | " |
| 198 | " | " | $NO_2$ | - | 1 | 0 | - | " | " | " |

-Continued

| Example | $Z^1$ | $Z^2$ | $Z^3$ | Z | m | n | $A^\ominus$ | $X-Z^4$ | $Z^5$ | Hue on polyester |
|---|---|---|---|---|---|---|---|---|---|---|
| 199 | $C_2H_5$ | $C_2H_5$ | $CONH_2$ | - | 1 | 0 | - | $COC_6H_5$ | CN | red |
| 200 | " | " | $CONHC_2H_5$ | - | 1 | 0 | - | " | " | " |
| 201 | " | " | $CON(C_2H_5)_2$ | - | 1 | 0 | - | " | " | " |
| 202 | " | " | 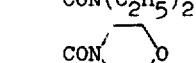 | - | 1 | 0 | - | " | " | " |
| 203 | " | " | 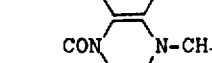 | - | 1 | 0 | - | " | " | " |
| 204 | " | " | 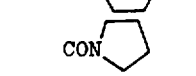 | - | 1 | 0 | - | " | " | " |
| 205 | " | " | $SO_2NH_2$ | - | 1 | 0 | - | " | " | " |
| 206 | " | " | 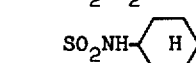 | - | 1 | 0 | - | " | " | " |
| 207 | " | " | 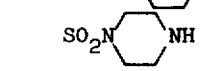 | - | 1 | 0 | - | " | " | " |
| 208 | " | " | $CO_2CH_3$ | - | 1 | 0 | - | " | " | " |
| 209 | " | " | tert.$C_4H_9$ | - | 1 | 0 | - | " | " | " |
| 210 | " | " | $CH_3$ | - | 1 | 0 | - | " | " | " |

| Example | $Z^1$ | $Z^2$ | $Z^3$ | Z | m | n | $A^\ominus$ | $X-Z^4$ | $Z^5$ | Hue on polyester |
|---|---|---|---|---|---|---|---|---|---|---|
| 211 | $C_2H_5$ | $C_2H_5$ | Cl | - | 1 | 0 | - | $COC_6H_5$ | CN | red |
| 212 | " | " | $OCH_3$ | - | 1 | 0 | - | " | " | " |
| 213 | " | " | $C_4H_9$ | - | 1 | 0 | - | " | " | " |
| 214 | " | " | $OC_2H_5$ | - | 1 | 0 | - | " | " | " |
| 215 | " | " | $OC_4H_9$ | - | 1 | 0 | - | " | " | " |
| 216 | " | " | H | $CH_3$ | 1 | 1 | $CH_3SO_4$ | " | " | Hue on polyacrylonitrile violet red |
| 217 | " | " | H | $C_2H_5$ | 1 | 1 | $C_2H_5SO_4$ | " | " | " |
| 218 | " | " | H | $CH_2C_6H_5$ | 1 | 1 | Br | " | " | " |
| 219 | " | " | H | $CH_2CH_2OH$ | 1 | 1 | Cl | " | " | " |
| 220 | " | " | H | $CH_2-CH(OH)CH_3$ | 1 | 1 | $1/2 ZnCl_4$ | " | " | " |
| 221 | " | " | H | $C_2H_4CN$ | 1 | 1 | $BF_4$ | " | " | " |
| 222 | " | " | H | $C_2H_4CO_2CH_3$ | 1 | 1 | $CH_3CO_2$ | " | " | " |
| 223 | " | " | H | $C_2H_4CO_2C_4H_9$ | 1 | 1 | $NO_2$ | " | " | " |
| 224 | " | " | H | $C_2H_4CO_2C_2H_5$ | 1 | 1 | SCN | " | " | " |

-Continued

| Example | $Z^1$ | $Z^2$ | $Z^3$ | Z | m | n | $A^\ominus$ | $X-Z^4$ | $Z^5$ | Hue on polyester |
|---|---|---|---|---|---|---|---|---|---|---|
| 225 | $C_2H_5$ | $C_2H_5$ | H | - | 1 | 0 | - | $COC_6H_5$ | CN | red |
| 226 | " | " | H | - | 1 | 0 | - | " | $CO_2C_4H_9$ | " |
| 227 | " | " | H | - | 1 | 0 | - | " | $CON(C_2H_5)_2$ | " |
| 228 | " | " | H | - | 1 | 0 | - | " | $CONH_2$ | " |
| 229 | " | " | H | - | 1 | 0 | - | " | 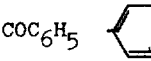 | " |
| 230 | " | " | H | - | 1 | 0 | - | " |  | " |
| 231 | " | " | H | - | 1 | 0 | - | " |  | " |
| 232 | " | " | H | - | 1 | 0 | - | " | $SO_2NHC_6H_5$ | " |
| 233 | " | " | H | - | 1 | 0 | - | " |  | " |
| 234 | " | " | H | - | 1 | 0 | - | " | $SO_2C_6H_5$ | " |
| 235 | " | " | H | - | 1 | 0 | - | " | $SO_2$-⟨⟩-$OC_2H_5$ | " |
| 236 | " | " | H | - | 1 | 0 | - | " | ⟨⟩ | " |
| 237 | " | " | H | - | 1 | 0 | - | " | ⟨⟩-CN | " |
| 238 | $C_2H_5$ | $C_2H_5$ | H | - | 1 | 0 | - | $COC_6H_5$ | ⟨⟩-Cl | red |
| 239 | " | " | H | - | 1 | 0 | - | " | ⟨⟩-$NO_2$ | " |
| 240 | " | " | H | - | 1 | 0 | - | " | 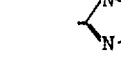 | " |
| 241 | " | " | H | - | 1 | 0 | - | " |  | " |
| 242 | " | " | H | - | 1 | 0 | - | " |  | " |
| 243 | " | " | H | - | 1 | 0 | - | " | 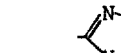 | " |
| 244 | " | " | H | - | 1 | 0 | - | " | benzothiazole | " |
| 245 | " | " | H | - | 1 | 0 | - | " |  | " |
| 246 | $C_2H_5$ | $C_2H_5$ | H | - | 1 | 0 | - | $COC_6H_5$ | 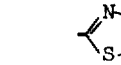 | red |
| 247 | " | " | H | - | 1 | 0 | - | " | benzoxazole | " |

| Example | $Z^1$ | $Z^2$ | $Z^3$ | Z | m | n | $A^\ominus$ | $X-Z^4$ | $Z^5$ | Hue on polyester |
|---|---|---|---|---|---|---|---|---|---|---|
| 248 | " | " | H | - | 1 | 0 | - | " | 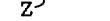 | " |

We claim:

1. A dye of the formula

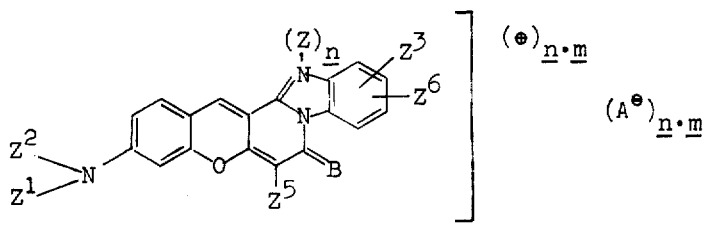

where

B is oxygen, imino or $N-X\!\!\!+_{\overline{m}}Z^4$,

X is —CO— or —SO$_2$—,

Z is methyl, ethyl, benzyl, β-hydroxyethyl, β-hydroxypropyl, β-hydroxy-γ-chloropropyl, β-cyanoethyl or β-carbalkoxyethyl, said alkoxy having one to four carbon atoms, $Z^1$ is alkyl of one to four carbon atoms, hydroxyalkyl of two to three carbon atoms, cyanoethyl, methoxyethyl, ethoxyethyl, methoxypropyl, acetoxyethyl, acetoxypropyl, carbalkoxyethyl, said alkoxy having one to four carbon atoms, benzyl or phenylethyl, $Z^2$ is hydrogen, alkyl of one to four carbon atoms or hydroxyethyl, $Z^1$ and $Z^2$ together with the nitrogen are pyrrolidine, piperidine, morpholine, piperazine or N-methylpiperazine, $Z^3$ is hydrogen, methyl, methoxy, chlorine, cyano or nitro, m is 1 or 2, n is 0 or 1, $Z^4$ (when m = 1) is alkyl of one to four carbon atoms, chloromethyl, bromomethyl, alkoxymethyl, said alkoxy having one to four carbon atoms, β-chloroethyl, β-bromoethyl, cyclohexyl, β-phenylvinyl, alkoxy of one to four carbon atoms, β-methoxyethoxy, β-ethoxyethoxy, phenyl, phenyl substituted by chloro, nitro, methyl or methoxy, alkylamino of one to four carbon atoms, cyclohexylamino, benzylamino, phenylamino or phenylamino substituted by chloro, trifluoromethyl, methyl or methoxy, and (when m = 2) is methylene, ethylene, phenylene, —O—C$_2$H$_4$O—, —O—C$_2$H$_4$OC$_2$H$_4$—O— or

-O-C$_2$H$_4$O-, -O-C$_2$H$_4$OC$_2$H$_4$-O- or

$Z^5$ is hydrogen, carbalkoxy having a total of two to five carbon atoms, carbo-β-methoxyethoxy, carbo-β-ethoxyethoxy, cyano, phenyl, phenylsulfonyl, carbamoyl, carbamoyl substituted at the nitrogen once or twice by alkyl of one to four carbon atoms, hydroxyalkyl of two to three carbon atoms, cyanoethyl, cyclohexyl, benzyl or phenyl, carbopyrrolidide, carbopiperidide, carbo-morpholide, carbo-piperazide or carbo-N-methylpiperazide, $Z^6$ is hydrogen or methyl and $A^-$ is a chloride, bromide, nitrate, sulfate, methosulfate, ethosulfate, phosphate, thiocyanate, formate, acetate, tolylsulfonyl or tetrachlorozincate anion 2. A dye as claimed in claim 1 in which B is $N-X)_m Z^4$.

3. A dye as claimed in claim 1 where B is oxygen or imino and $Z^5$ is hydrogen, phenyl or phenylsulfonyl.

4. A dye as claimed in claim 1 where m = 1.

5. A dye as claimed in claim 1 where $Z^1$ and $Z^2$ are methyl or ethyl.

6. A dye as claimed in claim 1 where n = 0.

7. A dye as claimed in claim 1 where n is 0, m is 1, $Z^1$ and $Z^2$ are methyl or ethyl, $Z^3$ is hydrogen, chloro or methyl, $Z^6$ is hydrogen or methyl, B is N—CO—$Z^4$ and $Z^4$ and $Z^5$ have the meanings given in claim 1.

8. A dye as claimed in claim 7, where $Z^4$ is phenyl or phenyl substituted by chloro, nitro, methyl or methoxy and $Z^5$ has the meaning given in claim 1.

9. A dye as claimed in claim 8 where $Z^5$ is hydrogen, cyano, carbalkoxy having a total of two to five carbon atoms, carbo-β-methoxyethoxy, carbo-β-ethoxyethoxy, carbamoyl, carbamoyl substituted at the nitrogen once to twice by alkyl of one to four carbon atoms, hydroxyalkyl of two or three carbon atoms, cyanoethyl, cyclohexyl, benzyl or phenyl, carbopyrrolidide, carbo-piperidide, carbo-morpholide, carbo-piperazide or carbo-N-methylpiperazide.

* * * * *